Nov. 21, 1967  E. J. JACOB  3,353,981
PLASTIC ARTICLES OF MANUFACTURE AND METHODS
OF PREPARING THE SAME
Filed Jan. 28, 1963                2 Sheets-Sheet 1

INVENTOR.
EZEKIEL J. JACOB
BY Michael S. Striker
Attorney

3,353,981
PLASTIC ARTICLES OF MANUFACTURE AND METHODS OF PREPARING THE SAME

Ezekiel J. Jacob, Brooklyn, N.Y., assignor of one-half to Michael S. Striker, New York, N.Y.
Filed Jan. 28, 1963, Ser. No. 254,073
11 Claims. (Cl. 117—8)

The present application is a continuation-in-part of my copending application Ser. No. 416,159, filed Mar. 15, 1954, and entitled, Plastic Articles of Manufacture and Methods of Preparing the Same, and now abandoned.

This invention relates to a new article of manufacture and a method of making the same.

More particularly this invention relates to a plastic coated fabric having plastic spheres embedded in the coating and a process for making such plastic coated fabric.

It is an object of this invention to provide a method for producing a light-weight plastic coated fabric.

It is another object of the invention to provide as a new article of manufacture a plastic coated fabric which is light in weight, buoyant and non-porous.

It is another object of the invention to provide a plastic coated fabric which has a certain degree of resiliency and is useful as a shock-absorbing medium.

It is still another object of the invention to provide a plastic coated fabric which is porous and has absorbent properties and a process for making the same.

A further object of the invention is to provide a plastic coated fabric which is warm to the touch and has heat-insulating properties.

Yet another object of the invention is to provide a plastic coated fabric and a method for manufacturing the same which plastic coated fabric has a gripping surface and may be made either porous or non-porous as desired.

In accordance with one embodiment of the invention, there is provided a fabric, and a plastic coating located at at least one face of said fabric and penetrating the same, said plastic coating having embedded therein a plurality of discrete, hollow, spheres of a plastic substance. The plastic body may be either thermosetting or thermoplastic and preferably will be of organic material but it is also within the scope of the present invention to employ inorganic thermoplastic hollow spheres, e.g., glass spheres. According to the properties desired for the finished article, the spheres may be filled with a gas which is heavier than or lighter than air, and which may be chemically inert or not, as desired.

In accordance with another embodiment of the invention, the plastic coating which forms an integral part of the composite fabric of the present invention comprises a plurality of discrete, gas-filled, hollow plastic spheres of small size which are embedded in a plastic substance so as to form in the fabric a plastic coating having spheres incorporated therein, and then a surface layer of the plastic coating is removed so as to remove the portions of the plastic spheres projecting into the surface layer, the thus created edges of the partly removed spheres forming gripping elements at the surface of the plastic coated fabric.

As will be described in more detail further below, the forming of the plastic coating can be controlled according to the present invention so as to have the major portion of the spheres located either in the immediate vicinity of the outer free face of the plastic coating, or spaced therefrom in the immediate vicinity of the fabric to which the coating adheres. In this manner certain important characteristics of the coated fabric, such as its thermal insulating effect, and its abrasion resistance, can be controlled and adjusted in accordance with the intended use of the coated fabric.

In accordance with a third embodiment of the invention, discrete plastic spheres are embedded in the plastic coating of the fabric so as to obtain a plastic coated fabric as previously described, and then sufficient pressure is applied to the coated fabric so as to rupture the spheres and provide interconnecting passages therebetween and to the surface of the plastic coating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
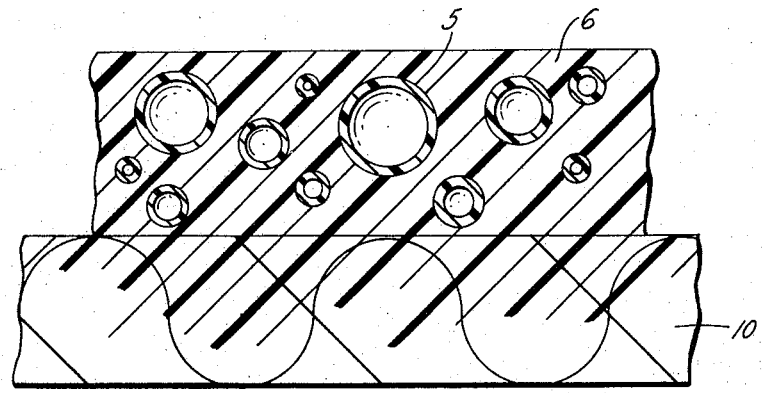
FIG. 1 is an enlarged view of a cross-section through a plastic coated fabric according to the present invention which has the spheres of plastic incorporated in the plastic coating.

Referring now to FIG. 1, there is shown a fabric 10 coated with a plastic body 6 comprising a thermoplastic material such as polyvinyl chloride. Embedded in the plastic body are a plurality of hollow phenolic resin spheres 5 having a diameter of about .0002 to .004 of an inch. According to the properties desired for the finished product, the spheres may be made of plastic substances other than phenolic resin and may be filled with a gas such as air, helium, nitrogen or any other gaseous or liquid medium. The plastic spheres are conventional and well known in the art. These spheres and methods of manufacture thereof are described, e.g., in U.S. Patents Nos. 2,797,201, 2,797,138, 2,797,139, 2,799,140 and 2,799,141.

Figure 5:
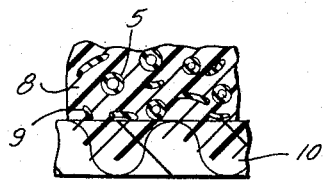
FIG. 5 is an enlarged view of a cross-section through a plastic coated fabric according to another embodiment of the present invention having plastic spheres and fibers embedded in the coating.

FIG. 5 shows fabric 10 coated with a plastic body 8 of a thermosetting casting resin such as diallyl phthalate in which are embedded hollow phenolic resin spheres 5 consisting of phenol-formaldehyde resin and formed with dinitrosopentamethylenetetramine as blowing agent in a manner known to those skilled in the art. The spheres are of a diameter of .0002 to .004 of an inch and short fibers of glass, textile or the like are incorporated in the coating.

It should be understood that although polyvinyl chloride is specified by way of example, many other thermoplastic materials are suitable for forming the coating embedding the plastic spheres. These include copolymers of vinylchloride containing a major portion of copolymerized vinylchloride, mixtures of polyvinylchloride with other thermoplastic resins, polyvinyl butyrate, polyvinyl acetate, polyvinyl alcohol, polyvinyl acetals such as polyvinyl formal, polyvinyl butyral, etc., polyvinylidene chloride, copolymers of vinylidene chloride and vinylchloride, polyvinyl aromatic compounds such as polystyrene, polydichlorostyrene, polyalphamethylstyrene, etc., and acrylic compounds such as polymethylacrylate, polyethylacrylate, polymethylmethacrylate, etc. The thermoplastic resins may be used with or without plasticizers.

The plastic coating material may readily be manufactured by dissolving the thermoplastic material in a solvent, adding the plastic spheres, stirring so as to distribute the spheres throughout the solution, applying the coating material to the fabric, and then heating so as to harden the plastic coating. Some typical solvents which may be used to dissolve the thermoplastic material are acetone, methylethyl ketone, ethyl acetate, etc. Illustrative of the plasticizers that may be used are: dioctyl phthalate, dibutyl phthalate, dimethyl phthalate, tricresyl phosphate, etc. Any of these plasticizers or mixtures of them may be employed with the process.

Where it is desired to produce a plastic coating without the use of solvents, as for example where coatings of large cross-sectional dimensions are to be produced, solid or vesicular plastisols, polyurethanes, or thermosets such as the following thermosets are used:

The plastic spheres are stirred into the monomer, or pre-polymer of the resin utilized, i.e. the monomer of methyl methacrylate, with a small amount of catalyst. After coating the fabric with the thus-formed mixture, the resin coating can be polymerized by the action of ultraviolet light, heat, or the exothermic action of the catalyst or catalysts used to initiate polymerization, or by a combination of one or more of these well known methods of inducing and effecting polymerization.

Following are typical examples of components which may be used in the manufacture of the coating illustrated in the drawing. It is to be understood, however, that the invention is not limited to these specific examples.

*Example I*

Mix 50 parts of polyvinyl chloride or a copolymer thereof with 50 parts of dioctyl phthalate and 20 parts of cyclohexanone and two parts lead stearate. Add 6 to 7 parts by weight of the plastic spheres. Stir the resulting mixture thoroughly so as to distribute the plastic spheres evenly and heat for about 2 to 4 hours at about 100–110° C. This period of heating, depending on the thickness of the section will evaporate the volatile solvent. The mass is then heated to 135° C. to cause the resin particles to dissolve in the high boiling solvent, or plasticizers, in this case dioctyl phthalate. Where an excess of volatile solvent is used, i.e. 4 parts per each part of resin, a solution will result and in this case mere evaporation of the volatile solvent will result in the cohesive sphere-containing plastic coating material. While the mass is still sufficiently soft it is applied to the fabric in per se conventional manner, by knife or doctor blade.

*Example II*

Mix 64 parts of polyvinyl acetate with 36 parts of dibutyl phthalate, add about 5% by weight of the plastic spheres. Stir vigorously and heat to a temperature of about 95° to desired coating consistency. Apply to fabric and continue heating at 95° C. so that combined heating time prior and after application of plastic material to fabric so as to form a coating thereon, will equal about 3 hours. As in the previous example, the heat causes the solvent to evaporate and the mass to plasticize and to form a coating having plastic spheres distributed evenly throughout.

*Example III*

Mix 60 parts of a copolymer consisting of 40 parts polyvinylidene chloride and 20 parts of polyvinylchloride, with 40 parts of tricresyl phosphate and 20 parts of acetone and 5 parts of an acid accepting stabilizer such as lead stearate. Add the plastic spheres in a sufficient amount so that the finished product contains about 5% by weight of plastic spheres. Stir the mixture thoroughly, apply to fabric adapted to withstand temperatures of 160° C. and heat to 160° for about 1½ hours. If desired, the coating may be rolled onto the fabric while stilll hot after about 1½ hours.

*Example IV*

In the three previous examples, processes have been described for embedding plastic spheres in a thermoplastic medium. It should be understood, however, that the invention is equally applicable to a thermosetting plastic medium. For example, the plastic spheres may be incorporated in a phenolic resin by mixing 75 parts of a 40% solution of formaldehyde with 95 parts of phenol, adding the plastic spheres to the above mixture, mixing vigorously, applying the mixture to the fabric, and heating to a temperature of 100° C. for about 2 hours at a pressure of about 2 atmospheres. The over-pressure is then released and the coated fabric heated further at 150° C. until all liquids have evaporated. The resulting coating is a hard, thermosetting plastic body which has evenly distributed therethrough the plastic spheres.

*Example V*

To 100 parts of a liquid casting resin such as diallyl phthalate, or a pre-polymer of a polyester such as glyceryl phthalate, polybasic acid-polyhydric alcohol copolymers, or a liquid casting resin according to the published formula of the U.S. National Bureau of Standards and known as "N.B.S. Casting Resin," is added a suitable catalyst such as benzoyl peroxide 1%, and plastic spheres—10%. This pre-polymer is used to coat and impregnate 60 parts of glass fiber or another fiber mat, or woven fabric or other filler. The impregnated layers are plied over a form and "cured" with heat or pressure or both.

The finished laminate, which is similar to the laminates from which plastic boat hulls and plastic automobile bodies are produced, has the added desirable qualities of buoyancy in water which is an advantage in boat hulls, and sound deadening qualities desirable in automobile bodies.

The laminates may also be used to produce radar domes with the additional advantage with respect to the dielectric constant and power factor caused by the presence of air cells occurring in the small plastic spheres.

The coated fabrics described in the above examples have numerous and important applications. The term "fabric" is to be understood broadly to include woven and non-woven fabrics of fibers of animal, vegetable, mineral and synthetic origin. For example, whereas a conventional vinyl plastic composition may have a specific gravity of about 1.3, the vinyl product described herein is light in weight and floats in water. It may thus be used as a coating and impregnating agent to provide buoyancy for boats, life preservers, ropes, nets, floats, tarpaulins, etc. Furthermore, the incorporation of the plastic spheres in a vinyl plastic medium makes the finished coating quite resilient. It is therefore particularly applicable for use as a coating in crash pads for the protection of aircraft personnel and in other shock-absorbing applications. The products of the present invention may also be used as a coating material for other sheet materials.

It has also been found that the herein described vinyl plastic product, particularly if the spheres are primarily located in the vicinity of the outer, free face of the coating, is both warm to the touch and has very good insulating properties. It is therefore particularly useful for clothing and other items of wearing apparel.

Figure 3:
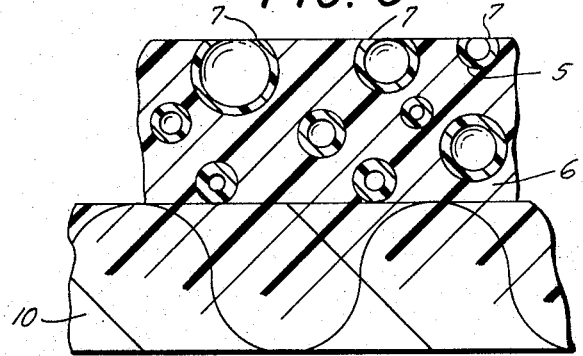
FIG. 3 is a cross-section as shown in FIG. 1 with a surface portion of the plastic coating removed.
Figure 4:
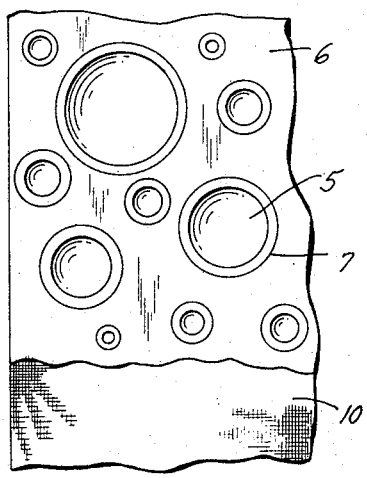
FIG. 4 is a plan view of FIG. 3.

FIGS. 3 and 4 are cross-sectional and plan views respectively of the herein described product with a portion of the surface of the coating removed by abrading or in any other way. The coated fabric thus-formed has numerous projecting elements 7 which provide a gripping surface. It is especially useful for drive belts, brake band linings and other similar items. The product has the advantage that although the surface is rough, the product itself is not porous throughout, i.e., is substantially impervious. Also, continued wear does not smooth out the surface for new plastic spheres are constantly ruptured and provide a fresh rough surface.

Figure 2:
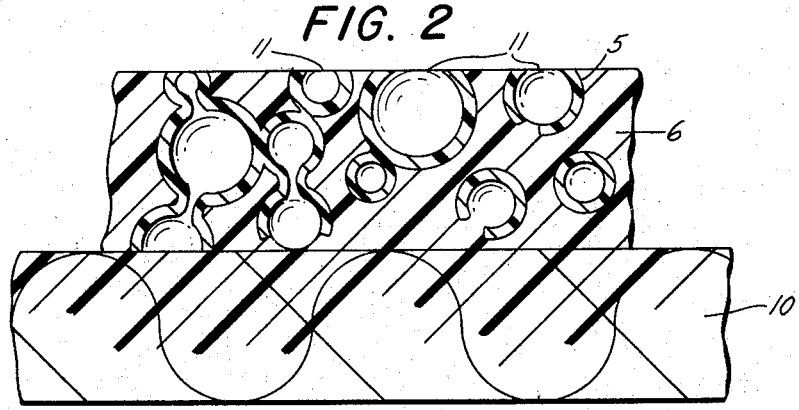
FIG. 2 is an enlarged view of a cross-section through the plastic coated fabric which has been subjected to pressure so as to rupture the spheres.

FIG. 2 shows another embodiment of the invention. The article shown in FIG. 1 is run through wringer rolls or placed in a hydraulic press and sufficient pressure applied so as to rupture the plastic spheres and provide interconnecting passages 11 between some of the spheres and to the surface of the plastic medium without, however, without damaging fabric layer 10. In an article actually manufactured, it was found that a pressure of about 200 pounds per square inch applied to a coating of polyvinyl plastic having embedded therein phenolic resin spheres was sufficient to rupture the spheres. As can readily be seen from FIG. 2, this product is quite porous.

Figure 6:
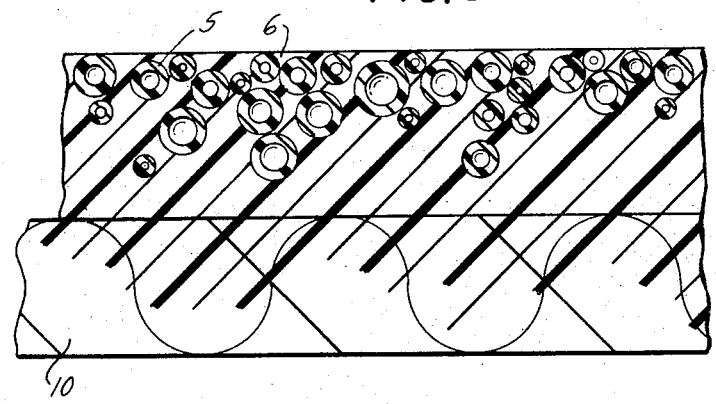
FIG. 6 is an enlarged view of a plastic coated fabric according to the present invention with the major portion of spheres located in the immediate vicinity of the free outer face of the coating.
Figure 7:
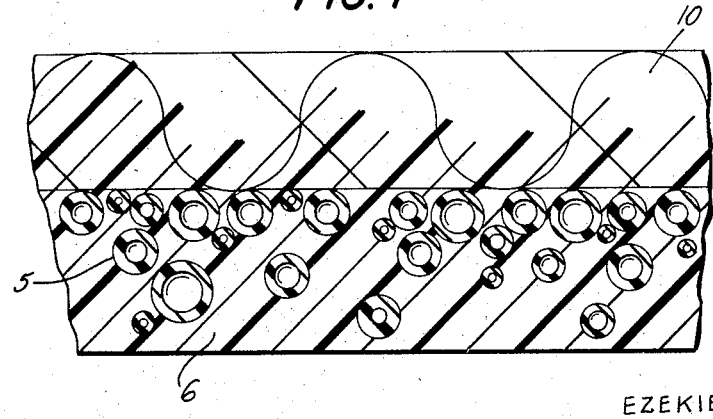
FIG. 7 is an enlarged view of a plastic coated fabric with the major portion of the spheres located in the immediate vicinity of the fabric.

According to preferred embodiments of the present invention, the distribution of the plastic spheres in the coating is controlled so that the major portion of the spheres is either located in the vicinity of the free outer face of the plastic coating or in the vicinity of the fabric layer, as illustrated, respectively, in FIGS. 6 and 7 of the drawing.

*Example VI*

A slurry is formed of 100 parts by weight of acrylonitrile butadiene rubber commercially available under the trade name "Hycar #1571 Latex" and 5 parts by weight of microballoons or plastic spheres. The plastic spheres are formed by spray drying an aqueous solution of a water-soluble partially polymerized phenol-formaldehyde resin and of a blowing agent, for instance 2½% of a blowing agent containing 40% dinitrosopentamethylenetetramine and 60% filler such as is commercially available under the trade name "Unicel N. D." The The size of the spheres which are produced in this manner can be controlled so that individual spheres will have diameters of between about 2 and 60 microns and, on the average, diameters of between about 15 and 30 microns. Preferably the maximum diameter of the spheres will not exceed 100 microns. A more detailed description of the manner in which these plastic microspheres can be produced will be found in the patents mentioned above.

An 80 x 80 cotton fabric of the type known as "balloon cloth" is then coated with the above slurry by means of a knife or doctor blade, for instance in a conventional "Scotch" or knife-over roll type coating machine. The coating is applied to the upper face of the fabric and will sufficiently penetrate the fabric to be firmly anchored thereto. The plastic spheres in the freshly applied coating will rise due to their buoyancy, or lesser specific weight, towards the upper, free face of the coating and will remain there during the drying and hardening of the coating. Drying preferably is carried out at somewhat elevated temperatures such as 60° C. The thickness of the wet coating as applied to the fabric is about 0.020″.

The thus prepared coated fabric having—as illustrated in FIG. 6—most of the plastic spheres located in the immediate vicinity of the free outer face of the coating, makes the same particularly useful as an insulating fabric, for instance for thermally insulating wearing apparel. The thus-coated face of the fabric is warm to the touch due to the accumulation of plastic spheres in the immediate vicinity thereof.

*Example VII*

The process of Example VI is repeated, however, the coating is applied in an "upside-down" position, i.e., to the lower face of the fabric. The fabric with the wet coating of an original thickness of 0.020″ located at its underside is then passed in that position through a dryer. The plastic spheres will rise and thus increase their distance from the free, outer face of the coating and become located in the immediate vicinity of fabric 10. The thus-produced coated fabric, illustrated in FIG. 7, is particularly useful where a tough, abrasion-resistant skin or outer portion is required for better wear resistance on thermally insulating apparel fabric for outer wear.

It will be understood that each of the elements described above, or two or more together, may also find a useful application in other types of plastic coated articles differing from the types described above.

While the invention has been illustrated and described as embodied in a plastic-coated fabric, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new article of manufacture, a coated fabric, comprising, in combination, a fabric layer; and an impregnating coating on said fabric consisting essentially of a plastic having cohesively embedded therein and distributed therethrough hollow synthetic resin bodies, said coating having one face in contact with said fabric and an opposite face further distant from said fabric, and the major portion of said hollow synthetic resin bodies being located closer to one than to the other of said faces.

2. A coated fabric as defined in claim 1, wherein the major portion of said hollow resin bodies is located in the vicinity of the outer, free face of said coating.

3. A coated fabric as defined in claim 1, wherein the major portion of said hollow resin bodies is located in the vicinity of said fabric layer spaced from the outer, free face of said coating.

4. As a new article of manufacture, a coated fabric, comprising, in combination, a fabric layer; and a coating adhering to at least one face of said fabric layer, said coating having a free outer face and consisting essentially of a resin body having cohesively embedded therein and distributed therethrough hollow synthetic resin bodies with the major portion of said hollow resin bodies located in the vicinity of the outer, free face of said coating farther distant from said fabric layer.

5. A coated fabric as defined in claim 4, wherein said free outer face of said coating contains broken portions of said hollow synthetic resin bodies.

6. A coated fabric as defined in claim 5 wherein said resin is selected from the group consisting of plasticizer-free and plasticizer-containing polyvinyl chloride, copolymers of vinyl chloride containing a major portion of copolymerized vinyl chloride, mixtures of polyvinyl chloride and other thermoplastic resins, cellulose butyrate, polycinyl acetate, polyvinyl alcohol, polyvinyl acetals, polyvinylidene chloride, copolymers of vinylidene chloride and vinyl chloride, polyvinyl aromatic compounds and acrylic compounds.

7. A coated fabric as defined in claim 4, wherein said hollow synthetic resin bodies are ruptured bodies forming interconnected passages therebetween.

8. A coated fabric as defined in claim 4, wherein said resin body is selected from the group consisting of thermoplastic and thermosetting resins.

9. As a new article of manufacture, a coated fabric, comprising, in combination, a fabric layer; and a coating adhering to at least one face of said fabric layer, said coating having a free outer face and consisting essentially of a resin body having cohesively embedded therein and distributed therethrough hollow synthetic resin bodies with the major portion of said hollow resin bodies located in the vicinity of said fabric layer farther distant from the outer, free face of said coating.

10. A coated fabric as defined in claim 9, wherein said hollow synthetic resin bodies are ruptured bodies forming interconnected passages therebetween.

11. A coated fabric as defined in claim 9 wherein said body is selected from the group consisting of thermoplastic and thermosetting resins.

References Cited

UNITED STATES PATENTS

| | | | |
|---|---|---|---|
| 2,797,201 | 6/1957 | Veatch et al. | 260—2.5 |
| 2,885,303 | 5/1959 | Kaplan | 260—2.5 |
| 3,143,436 | 8/1964 | Dosmann | 117—11 |

ALFRED L. LEAVITT, *Primary Examiner.*

RICHARD D. NEVIOUS, JOSEPH B. SPENCER, *Examiners.*

A. H. ROSENSTEIN, *Assistant Examiner.*